(12) United States Patent
Liu (10) Patent No.: US 12,363,757 B2
(45) Date of Patent: Jul. 15, 2025

(54) METHOD AND APPARATUS FOR FREQUENCY DOMAIN CONFIGURATION OF RANDOM ACCESS OCCASION, AND STORAGE MEDIUM

(71) Applicant: BEIJING XIAOMI MOBILE SOFTWARE CO., LTD, Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 673 days.

(21) Appl. No.: 17/764,533

(22) PCT Filed: Sep. 26, 2019

(86) PCT No.: PCT/CN2019/108055
§ 371 (c)(1),
(2) Date: Mar. 28, 2022

(87) PCT Pub. No.: WO2021/056311
PCT Pub. Date: Apr. 1, 2021

(65) Prior Publication Data
US 2022/0353919 A1 Nov. 3, 2022

(51) Int. Cl.
| | | |
|---|---|---|
| *H04W 74/0833* | (2024.01) |
| *H04B 7/204* | (2006.01) |
| *H04L 25/03* | (2006.01) |
| *H04W 74/08* | (2009.01) |
| *H04W 74/0836* | (2024.01) |
| *H04L 12/413* | (2006.01) |

(52) U.S. Cl.
CPC ...... *H04W 74/0833* (2013.01); *H04B 7/2043* (2013.01); *H04L 25/03159* (2013.01); *H04W 74/0836* (2024.01); *H04W 74/0866* (2013.01); *H04L 12/413* (2013.01)

(58) Field of Classification Search
CPC ........... H04L 25/03159; H04L 12/413; H04W 74/0833; H04W 74/0836; H04B 7/2043
See application file for complete search history.

(56) References Cited

U.S. PATENT DOCUMENTS

| | | | |
|---|---|---|---|
| 9,629,136 B1 | 4/2017 | Sitaram et al. |
| 2013/0182626 A1 | 7/2013 | Kuo |
| 2018/0110074 A1* | 4/2018 | Akkarakaran | ........ H04W 72/21 |

(Continued)

FOREIGN PATENT DOCUMENTS

| | | |
|---|---|---|
| CN | 102291845 A | 12/2011 |
| CN | 106899964 A | 6/2017 |
| CN | 109863814 A | 6/2019 |

OTHER PUBLICATIONS

International Search Report of PCT/CN2019/108055 dated Jun. 23, 2020 with English translation, (4p).

(Continued)

*Primary Examiner* — Salvador E Rivas
(74) *Attorney, Agent, or Firm* — Arch & Lake LLP (57) ABSTRACT

A method for configuring a random access occasion, the method comprising: an access network device sends RO configuration parameters, the configuration parameters comprising: the shift value of the starting position of a shared RO relative to the starting position of an RO adopted for four-step random access, the shared RO being an RO shared by four step random access and two step random access.

13 Claims, 8 Drawing Sheets

(56) References Cited

U.S. PATENT DOCUMENTS

| | | | |
|---|---|---|---|
| 2019/0380156 A1 | 12/2019 | Akkarakaran et al. | |
| 2019/0387546 A1* | 12/2019 | Li | H04L 27/26025 |
| 2020/0252959 A1* | 8/2020 | Sun | H04W 74/0808 |
| 2021/0014902 A1* | 1/2021 | Guo | H04W 56/001 |
| 2021/0127429 A1* | 4/2021 | Huang | H04W 74/0891 |
| 2021/0136827 A1* | 5/2021 | Xiong | H04W 74/0833 |
| 2021/0329704 A1* | 10/2021 | Yang | H04L 5/0048 |
| 2022/0287108 A1* | 9/2022 | Takahashi | H04W 74/0841 |

OTHER PUBLICATIONS

First Office Action issued to Chinese Application No. 201980002167.2 dated Nov. 4, 2021 with English translation, (13p).
Spreadtrum Communications, "Discussion on 2-Step RACH Procedure", 3GPP TSG RAN WG1 Meeting #98, R1-1908967, Prague, Czech Republic Aug. 26-30, 2019, (6p).
Ericsson, "Procedure for Two-Step RACH", 3GPP TSG-RAN WG1 Meeting #97, R1-1907181, Reno, NV, May 13-17, 2019, (8p).
CNOA of Application No. 201980002167.2 dated on Jun. 6, 2022 with English translation, (13p).
Huawei, et al. "Discussion on the MsgA resource configuration" 3GPP TSG-RAN WG2 #107, R2-1910670, Prague, CR, Aug. 26-30, 2019, (6p).

* cited by examiner

METHOD AND APPARATUS FOR FREQUENCY DOMAIN CONFIGURATION OF RANDOM ACCESS OCCASION, AND STORAGE MEDIUM

CROSS REFERENCE

The present application is the U.S. national phase application of International application Ser. No. PCT/CN2019/108055, filed on Sep. 26, 2019, the content of which is incorporated hereby in its entirety for all purposes.

TECHNICAL FIELD

The present disclosure relates to the field of communication technologies, and in particular, to a random access occasion (RACH Occasion, RO) configuration method, an apparatus and storage medium.

BACKGROUND

The Third Generation Partnership Project (3GPP) has carried out the standardization of a 2-step random access. The two-step random access is a simplification relative to a 4-step random access. That is, it only includes a message A (Msg A) sent by a terminal to a base station and a message B (Msg B) fed back to the terminal by the base station.

Msg A includes a physical random access channel (PRACH) and a physical uplink shared channel (PUSCH). Furthermore, the random access occasion (RO) used by the PRACH is obtained by configuring a system message.

The two-step random access and the four-step random access can share the configuration of all or part of the ROs. However, there is no reasonable technical solution for how to configure the shared ROs.

SUMMARY

According to an aspect of the present disclosure, a random access occasion (RO) configuration method is provided. The random access occasion (RO) configuration method includes: sending, by an access network device, configuration parameters of ROs, wherein the configuration parameters includes a shift value of a starting position of at least one shared RO relative to a starting position of at least one RO adopted for a four-step random access, and the shared RO is a RO that shared by the four-step random access and a two-step random access.

According to another aspect of the present disclosure, a random access occasion (RO) configuration method is provided. The random access occasion (RO) configuration method includes receiving, by user equipment, configuration parameters of ROs, wherein the configuration parameters comprises a shift value of a starting position of at least one shared RO relative to a starting position of at least one RO adopted for a four-step random access, and the shared RO is a RO that shared by the four-step random access and a two-step random access; and determining, by the terminal, a frequency-domain position of the at least one shared RO according to the configuration parameters of ROs.

According to an aspect of the present disclosure, a terminal is provided. The terminal includes: a processor; a transceiver connected to the processor; and a memory for storing instructions executable by the processor; wherein the processor is configured to receive configuration parameters of ROs, wherein the configuration parameters includes a shift value of a starting position of at least one shared RO relative to a starting position of at least one RO used for a four-step random access, and the shared RO is a RO that shared by the four-step random access and a two-step random access; and determine a frequency-domain position of the at least one shared RO according to the configuration parameters of ROs.

BRIEF DESCRIPTION OF THE DRAWINGS

In order to illustrate the technical solutions in the examples of the present disclosure more clearly, the following briefly introduces the accompanying drawings used in the description of the examples. Obviously, the accompanying drawings in the following description are only some examples of the present disclosure. For those of ordinary skill in the art, other drawings can also be obtained from these drawings without creative effort.

DETAILED DESCRIPTION

In order to make the objectives, technical solutions and advantages of the present disclosure clearer, the embodiments of the present disclosure will be further described in detail below with reference to the accompanying drawings.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Several technical terms involved in the embodiments of the present disclosure are briefly introduced below.

The communication systems and service scenarios described in the embodiments of the present disclosure are for the purpose of illustrating the technical solutions of the embodiments of the present disclosure more clearly, and do not constitute a limitation on the technical solutions provided by the embodiments of the present disclosure. The skilled in the art will understand that as the evolution of new business scenarios and the emergence of new business scenarios, the technical solutions provided by the embodiments of the present disclosure are also applicable to similar technical problems.

Figure 1:
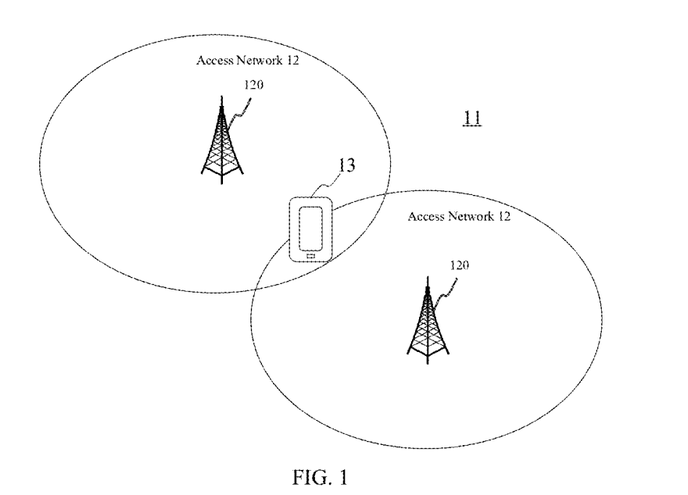
FIG. 1 is a block diagram of a communication system provided by some examples of the present disclosure.

FIG. 1 shows a block diagram of a communication system provided by some embodiments of the present disclosure. The communication system may include an access network 12 and a terminal 13.

The access network 12 includes several access network devices 120. The access network device 120 may be a base station, and the base station is a device deployed in an access network to provide a wireless communication function to a terminal. The base station may include various forms of macro base station, micro base station, relay station, access point and so on. In systems using different radio access technologies, names of devices with base station functions may be different. For example, in LTE systems, the base station is called eNodeB or eNB; while in 5G NR-U systems, the base station is called gNodeB or gNB. As communication technology evolves, the description of 'base station' may change. For the convenience, in the embodiments of the present disclosure, the above-mentioned device for providing a wireless communication function for the terminal 13 are collectively referred to as access network device. In some embodiments, the access network device 120 includes a source base station and a target base station.

The terminal 13 may include various handheld devices with wireless communication functions, vehicle-mounted devices, wearable devices, computing devices or other processing devices connected to the wireless modem, as well as various forms of terminals (User Equipment, UE), mobile stations (MS), terminal devices, etc. For the convenience of description, the devices mentioned above are collectively referred to as terminals. The access network device 120 and the terminal 13 communicate with each other through a certain air interface technology, such as a Uu interface.

Random Access Procedure

The random access procedure refers to a process starting from when a user sends a random access preamble sequence to try to access a network until a basic signaling connection is established with the network. The random access procedure is one of the most basic requirements of any one cellular communication system and is used to enable the terminal to establish data communication with the network side.

The random access procedure is divided into a four-step random access and a two-step random access.

Four-Step Random Access Procedure

Figure 2:
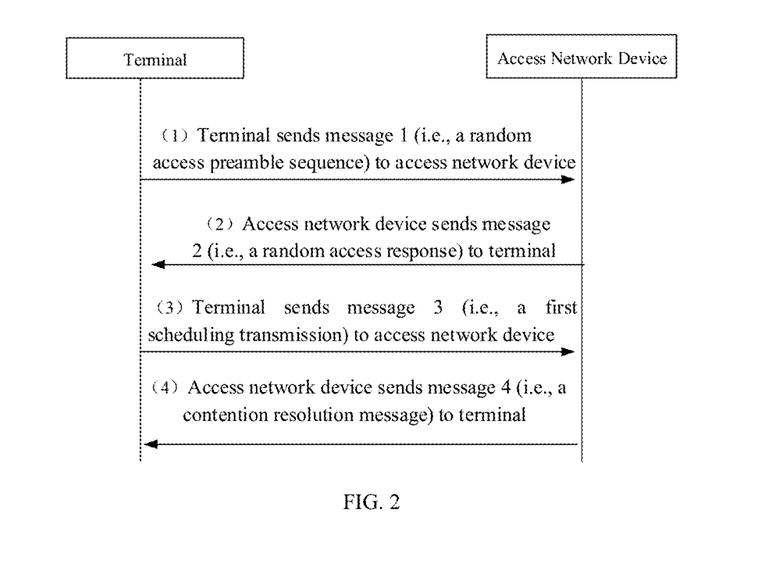
FIG. 2 is a flowchart of a four-step random access provided by some examples of the present disclosure.

FIG. 2 shows that in a contention-based random access procedure. The four-step random access procedure include the following (1)-(4).

(1) The terminal sends a message 1 (i.e., a random access preamble sequence, preamble) to the access network device;

The terminal sends the random access preamble sequence (preamble) to the access network device, and the access network device estimates a transmission delay of the terminal based on the random access preamble sequence, so as to realize uplink synchronization.

(2) The access network device sends a message 2 (i.e., a random access response, RAR) to the terminal.

The access network device sends a timing advance command based on the transmission delay estimated in the first step above to adjust a sending time of the terminal. The message 2 is organized by the Media Access Control (MAC) layer of the access network device and is carried by the Down Link Share Channel (DL_SCH). The message 2 can respond to random access requests from multiple terminals at the same time.

The access network device uses the Physical Downlink Control Channel (PDCCH) to schedule the message 2, and addresses (also called scrambling) through C-RNTI or RA-RNTI. RA-RNTI is determined by a location of a time-frequency resource of the Physical Random Access Channel (PRACH) carrying the massage 1. The message 2 contains a timing advance for the uplink transmission, and allocates uplink resources and temporary C-RNTI for a message 3. The timing advance means an amount of time in advance.

(3) The terminal sends the message 3 (i.e., a first scheduling transmission) to the access network device.

After receiving the message 2, the terminal transmits the message 3 on the allocated uplink resources, and sends a user equipment Identify (UE ID) to the access network device through the physical uplink shared channel (PUSCH).

In some embodiments, the message 3 includes a Service Data Unit (SDU) of a common control channel (CCCH), used for a message 4 to carry a contention resolution ID.

(4) The access network device sends the message 4 (i.e., a contention resolution message) to the terminal.

The access network device sends the contention resolution message to the terminal via the Physical Downlink Share Channel (PDSCH).

Two-Step Random Access Procedure

Figure 3:
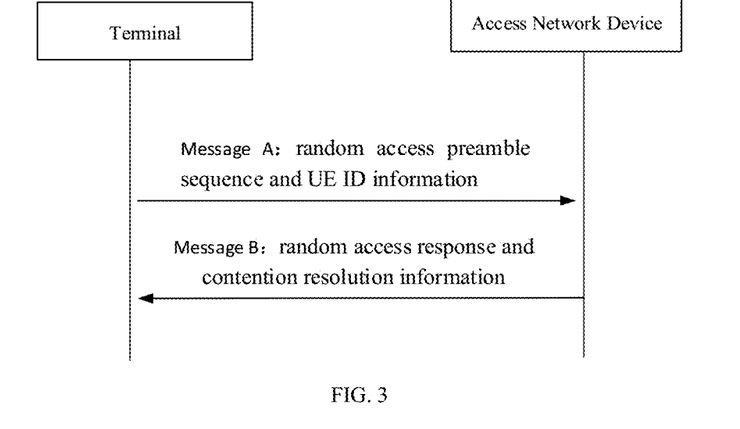
FIG. 3 is a flowchart of a two-step random access provided by some examples of the present disclosure.

In the contention-based random access procedure, the four-step random access procedure can be combined into a two-step random access procedure. Referring to FIG. 3, after combination, the two-step random access procedure includes a message A and a message B, and the relevant steps include the following (1) and (2).

(1) The terminal sends the message A to the access network device.

(2) After receiving the message A sent by the terminal, the access network device sends the message B to the terminal.

In some embodiments, the message A includes contents of message 1 and message 3. That is, the message A includes the random access preamble sequence and the UE ID, and the UE ID may be one of C-RNTI, temporary C-RNTI, and RA-RNTI.

In some embodiments, the message B includes contents of message 2 and message 4. That is, the message B includes the random access response and the contention resolution information.

Figure 4:
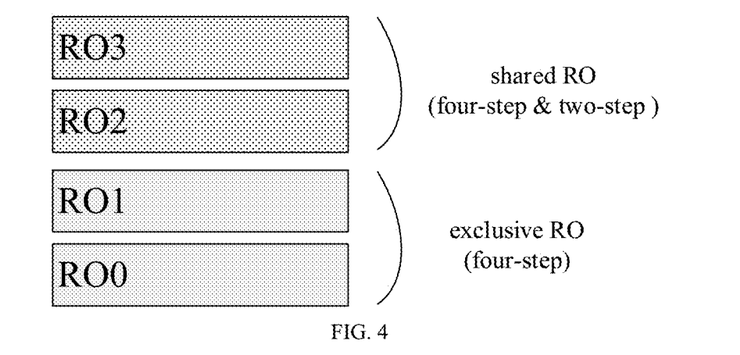
FIG. 4 is a flowchart of a random access occasion (RO) configuration method in the related art.

FIG. 4 shows a schematic diagram of a random access occasion (RO) configuration method in related art. The access network device sends configuration parameters of one or more ROs to the user equipment (UE), and the configuration parameters of the ROs include:

1. FDM for 4-step=4, that is, the number of at least one RO that is frequency-division multiplexed at a moment when accessed by the four-step random access is 4.

2. FDM for 2-step=2, that is, the number of at least one RO that is frequency-division multiplexed at a moment when accessed by the two-step random access is 2.

According to the configuration parameters of the ROs, the UE can confirm that there are 4 ROs in the frequency domain, i.e., RO 0, RO 1, RO 2, and RO 3. Among them, RO 0 and RO 1 are the two ROs exclusively used for the four-step random access, and RO 2 and RO 3 are the two ROs that are shared and used by the four-step random access and the two-step random access. However, in this configuration method, the starting point of the one or more shared ROs is the default, so the configuration method is relatively simple and not flexible enough.

Figure 5:
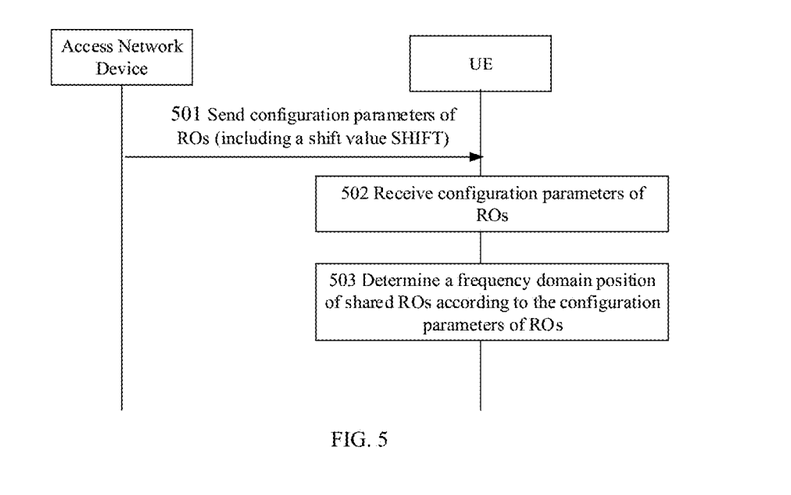
FIG. 5 is a flowchart of a random access occasion (RO) configuration method provided by some examples of the present disclosure.

FIG. 5 shows a schematic diagram of a random access occasion (RO) configuration method provided by some embodiments of the present disclosure. This embodiment is illustrated by taking the method applied to the communication system shown in FIG. 1 as an example. The method includes steps 501- 503.

At step 501, configuration parameters of one or more ROs are sent by the access network device.

At step 502, the configuration parameters of ROs are received by the UE, and the configuration parameters includes a shift value of a starting position of one or more shared ROs relative to a starting position of one or more ROs used by the four-step random access, and the shared RO is a RO that shared and used by the four-step random access and two-step random access.

In some embodiments, the starting position refers to a starting position in the frequency domain dimension.

The starting position of the one or more ROs used by the four-step random access is determined by configuration parameters of the one or more ROs used by the four-step random access.

The starting position of the one or more shared RO is determined by the configuration parameters of one or more ROs used by the four-step random access and the two-step random access. Alternatively, the configuration parameters of the one or more ROs used by the four-step random access and the configuration parameters of the one or more ROs used by the two-step random access are configured separately.

At step 503, a frequency domain position of the one or more shared ROs is determined according to the configuration parameters of the ROs.

To sum up, in the method provided according to this embodiment, by configuring, by the access network device, the configuration parameters of the random access occasions (ROs) for the UE, and the configuration parameters including a shift value used to indicate the starting position of the one or more shared ROs, UE can determine the frequency domain position of the one or more shared ROs based on the configuration parameters (for example, the starting position of the one or more shared ROs is determined according to the shift value), so as to realize the flexible configuration of the random access occasions (ROs) in different frequency domain positions, and improve the flexibility of the configuration method.

In some embodiments based on FIG. 5, the configuration parameters of the random access occasions (ROs) include a first number and a second number.

The first number is the number of one or more ROs that are frequency-domain multiplexed (FDM) in the frequency domain at a moment when accessed through the two-step random access, and the first number is one of the following numbers: 1, 2, 4, and 8. In other embodiments, the first number may also be a number larger than 8, such as 16, 32, etc., and the present disclosure does not limit the specific value of the first number;

The second number is the number of one or more ROs that are frequency-domain multiplexed (FDM) in the frequency domain at a moment when accessed through the four-step random access, and the second number is one of the following numbers: 1, 2, 4, and 8. In other embodiments, the second number may also be a number larger than 8, such as 16, 32, etc., and the present disclosure does not limit the specific value of the second number.

In some embodiments, the first number is less than or equal to the second number.

In some embodiments based on FIG. 5, the configuration parameters of the ROs also include the exclusive number.

The exclusive number is the number of ROs that are frequency-division multiplexed (FDM) in the frequency domain only used by the four-step random access at the moment when accessed through the four-step random access. The exclusive number=the second number–the first number.

In some embodiments based on FIG. 5, the configuration parameters of the ROs also include a starting position of one or more ROs used by the four-step random access.

The starting position of one or more ROs used by the four-step random access refers to the starting position in the frequency domain dimension of the one or more ROs used by the four-step random access.

That is, the access network device can configure, for the one or more ROs used for the two-step random access, a separate message 1-FDM and the starting position of the message 1-FDM in the frequency domain. At the same time, a two-step random access preamble may also be allocated from a Non Contention Based Random Access (CBRA) preamble associated with each SSB.

Figure 6:
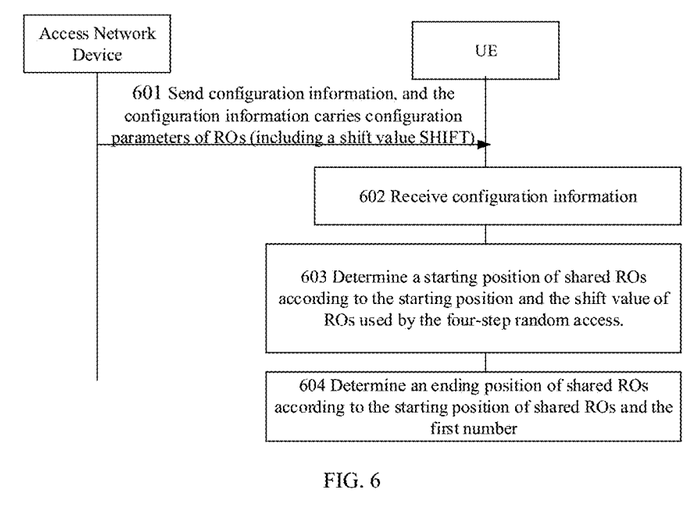
FIG. 6 is a flowchart of a random access occasion (RO) configuration method provided by some examples of the present disclosure.

FIG. 6 shows a schematic diagram of a random access occasion (RO) configuration method provided by some embodiments of the present disclosure. This embodiment is illustrated by taking the method applied to the communication system shown in FIG. 1 as an example. The method includes steps 601-603.

At step 601, configuration information is sent by the access network device, and the configuration information carries configuration parameters of ROs.

At step 602, the configuration information is received by the UE, and the configuration information carries the configuration parameters of the ROs. The configuration parameters include: a starting position of one or more ROs used by a four-step random access, and a shift value of a starting position of one or more shared ROs relative to the starting position of the one or more ROs used by the four-step random access, wherein, the shared RO is a RO that shared and used by the four-step random access and the two-step random access.

Alternatively, the configuration parameters further include at least one of the following parameters:

1. the first number $FDM_{2\text{-}step}$, which is the number of one or more ROs that are frequency-division multiplexed (FDM) in the frequency domain at a moment when accessed by the two-step random access, wherein the first number $FDM_{2\text{-}step}$ is one of the following numbers: 1, 2, 4, 8, 16, and 32;

2. the second number $FDM_{4\text{-}step}$, which is the number of one or more ROs that are frequency-division multiplexed (FDM) in the frequency domain at a moment when accessed by the four-step random access, wherein the second number $FDM_{4\text{-}step}$ is one of the following numbers: 1, 2, 4, 8, 16, and 32, Wherein, the first number $FDM_{2\text{-}step}$ is less than or equal to the second number $FDM_{4\text{-}step}$;

3. the exclusive number $FDM_{4\text{-}step\ only}$, which is the number of one or more ROs that are frequency-division multiplexed (FDM) in the frequency domain only used by the four-step random access at the moment when accessed by the four-step random access, wherein the exclusive number $FDM_{4\text{-}step\ only}$=the second number $FDM_{4\text{-}step}$–the first number $FDM_{2\text{-}step}$.

4. a starting position of one or more ROs used by the four-step random access, and the starting position refers to the starting position in the frequency domain dimension of one or more ROs used by the four-step random access.

It should be noted that, different parameters in the configuration parameters of the ROs are carried in the same or different configuration information. The configuration information may be Remaining Minimum System Information (RMSI).

At step 603, a starting position of one or more shared ROs is determined by the UE according to the starting position and the shift value of the one or more ROs used by the four-step random access.

Assume that $FDM_{2\text{-}step}$ is the first number of one or more ROs that are frequency-division multiplexed (FDM) in the frequency domain at a moment when accessed by the two-step random access, and a value range of the first number is (1, 2, 4, 8, 16, 32); $FDM_{4\text{-}step}$ is the second number of one or more ROs that are frequency-division multiplexed (FDM) in the frequency domain at a moment when accessed by the four-step random access, and a value range of the second number is (1, 2, 4, 8, 16, 32), and the first number is less than the second number.

Assume that the exclusive number $FDM_{4\text{-}step\ only}$ is the number of one or more ROs that are frequency-division multiplexed (FDM) in the frequency domain only used by the four-step random access at the moment when accessed by the four-step random access, and a value range of the exclusive number $FDM_{4\text{-}step\ only}$ is (1, 2, 4, 8, 16, 32). When the exclusive number $FDM_{4\text{-}step\ only}$=8, there is no shared RO.

At step 604, an ending position of the one or more shared ROs is determined by the UE according to the start position of the one or more shared ROs and the first number $FDM_{2\text{-}step}$.

The starting position of the one or more ROs used by the four-step random access is x, the shift value is SHIFT, the starting position of the one or more shared ROs is x+SHIFT, and the ending position of the one or more shared ROs is $x+SHIFT+FDM_{2\text{-}step}*W$. Wherein the W is a width of a single RO in the frequency domain.

Figure 7:
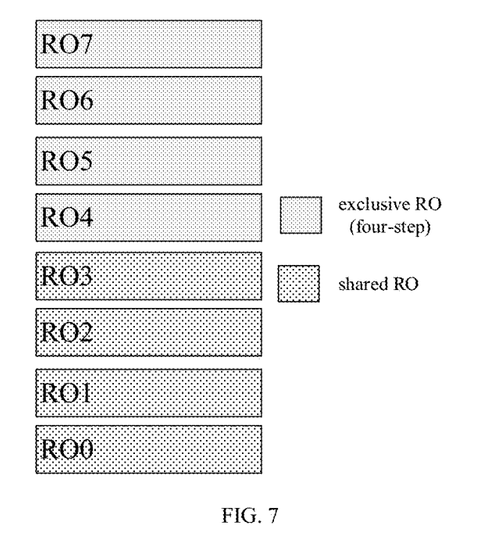
FIG. 7 is a schematic diagram of a random access occasion (RO) configuration method provided by some examples of the present disclosure when implemented.

In an example, $FMD_{4\text{-}step}$=8, $FMD_{2\text{-}step}$=4, SHIFT=0, the starting position of the one or more shared ROs is RO0, and the ending position of the one or more shared ROs is RO3, as shown in FIG. 7.

Figure 8:
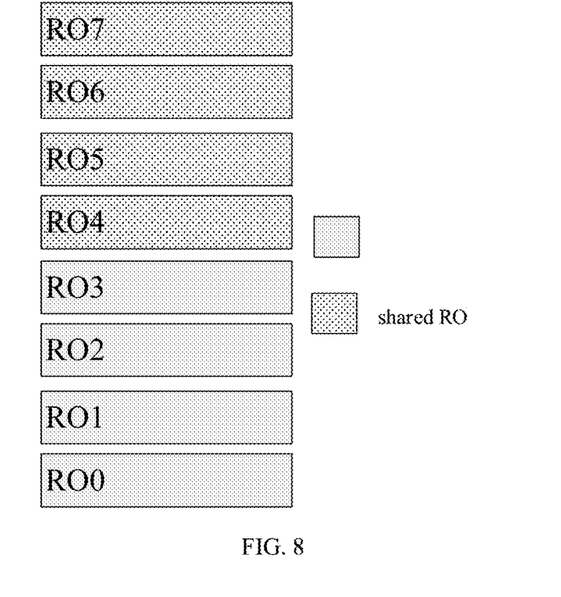
FIG. 8 is a schematic diagram of a random access occasion (RO) configuration method provided by some examples of the present disclosure when implemented.

In an example, $FMD_{4\text{-}step}$=8, $FMD_{2\text{-}step}$=4, SHIFT=4, then the starting position of the one or more shared ROs is RO4, and the ending position of the one or more shared ROs is RO7, as shown in FIG. 8.

Figure 9:
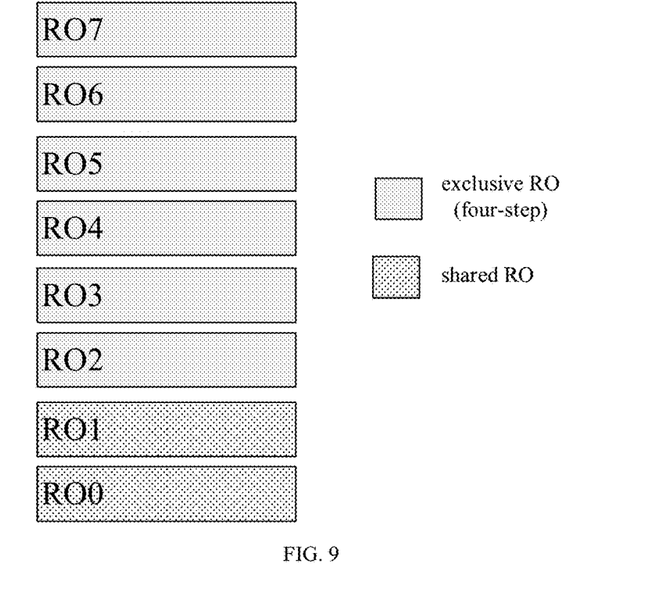
FIG. 9 is a schematic diagram of a random access occasion (RO) configuration method provided by some examples of the present disclosure when implemented.

In an example, $FMD_{4\text{-}step}$=8, $FMD_{2\text{-}step}$=2, SHIFT=0, then the starting position of the one or more shared ROs is RO0 and the ending position of the one or more shared ROs is RO1, as shown in FIG. 9.

Figure 10:
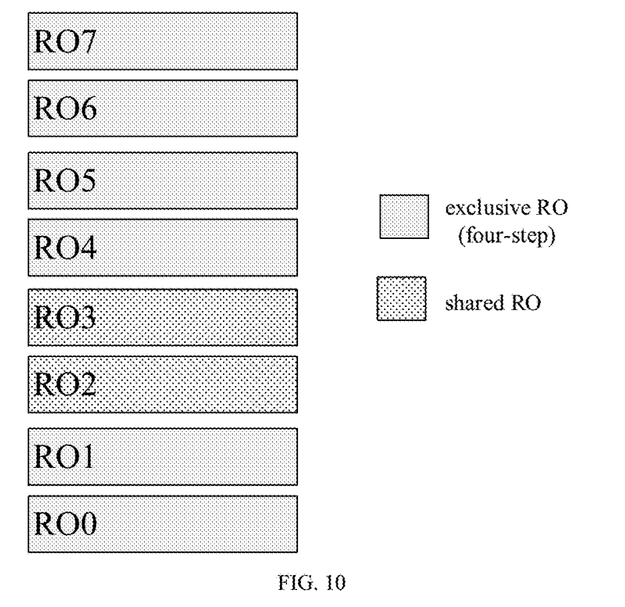
FIG. 10 is a schematic diagram of a random access occasion (RO) configuration method provided by some examples of the present disclosure when implemented.

In an example, $FMD_{4\text{-}step}$=8, $FMD_{2\text{-}step}$=2, SHIFT=2, then the starting position of the one or more shared ROs is RO2, and the ending position of the one or more shared ROs is RO3, as shown in FIG. 10.

Figure 11:
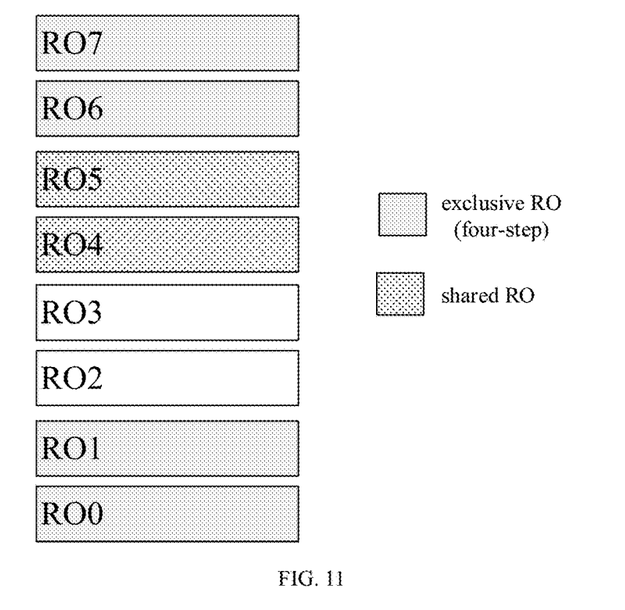
FIG. 11 is a schematic diagram of a random access occasion (RO) configuration method provided by some examples of the present disclosure when implemented.

In an example, $FMD_{4\text{-}step}$=8, $FMD_{2\text{-}step}$=2, SHIFT=4, then the starting position of the one or more shared ROs is RO4, and the ending position of the one or more shared ROs is RO5, as shown in FIG. 11.

Figure 12:
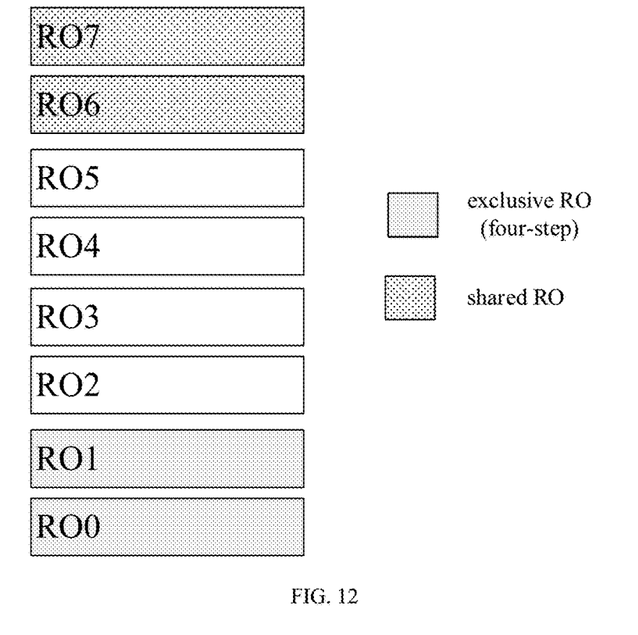
FIG. 12 is a schematic diagram of a random access occasion (RO) configuration method provided by some examples of the present disclosure when implemented.

In an example, $FMD_{4\text{-}step}$=8, $FMD_{2\text{-}step}$=2, SHIFT=6, then the starting position of the one or more shared ROs is RO6, and the ending position of the one or more shared ROs is RO7, as shown in FIG. 12.

Figure 13:
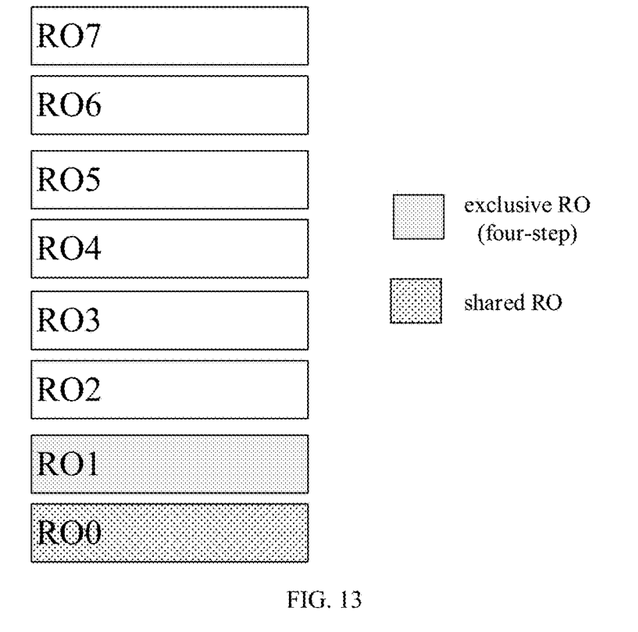
FIG. 13 is a schematic diagram of a random access occasion (RO) configuration method provided by some examples of the present disclosure when implemented.

In an example, $FMD_{4\text{-}step}$=8, $FMD_{2\text{-}step}$=1, SHIFT=0, then the start position and the ending position of the one or more shared ROs are RO0, as shown in FIG. 13.

Figure 14:
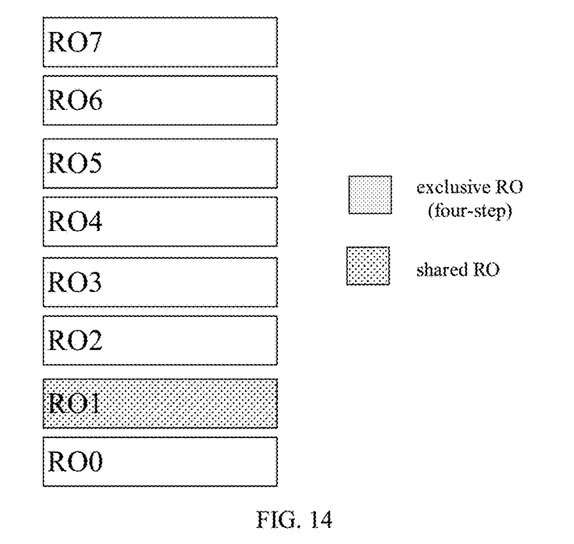
FIG. 14 is a schematic diagram of a random access occasion (RO) configuration method provided by some examples of the present disclosure when implemented.

In an example, $FMD_{4\text{-}step}=8$, $FMD_{2\text{-}step}=1$, SHIFT=1, then the start position and the ending position of the one or more shared ROs are RO1, as shown in FIG. 14.

Figure 15:
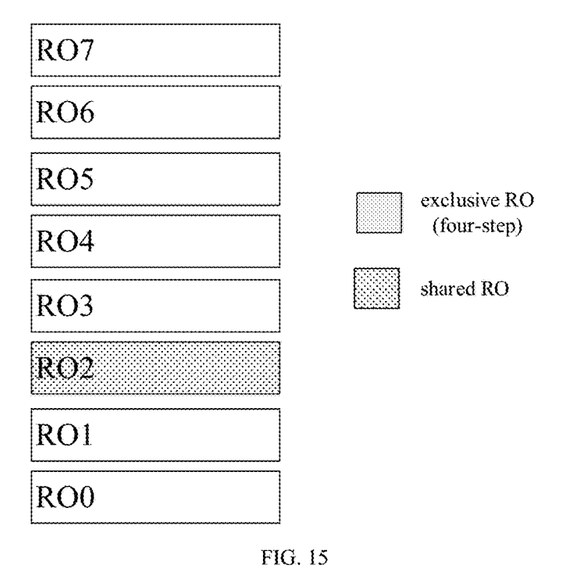
FIG. 15 is a schematic diagram of a random access occasion (RO) configuration method provided by some examples of the present disclosure when implemented.

In an example, $FMD_{4\text{-}step}=8$, $FMD_{2\text{-}step}=1$, SHIFT=2, then the starting position and the ending position of the one or more shared ROs are RO2, as shown in FIG. 15. For the case of shift=3 or 4 or 5 or 6 or 7, and so on, and will not be repeated.

In an example, $FMD_{4\text{-}step}=8$, $FMD_{4\text{-}step\ only}=4$, $FMD_{2\text{-}step}=4$, SHIFT=4, then the starting position of the one or more shared ROs is RO4, and the ending position of the one or more shared ROs is RO7, as shown in FIG. 8.

To sum up, in the method provided in this embodiment, by configuring, by the access network device, the configuration parameters of the random access occasions (ROs) for the UE, and the configuration parameters including a shift value used to indicate the starting position of the one or more shared ROs, UE can determine the frequency domain position (for example, the starting position and the ending position) of the one or more shared ROs based on the configuration parameters, so as to realize the flexible configuration of the random access occasions (ROs) in different frequency domain positions, and improve the flexibility of the configuration method.

It should be noted that the above steps performed by the UE can be implemented as a configuration method for the random access occasions on the terminal side, and the above steps performed by the access network device can be implemented as a configuration method for the random access occasions on the access network device side.

Figure 16:
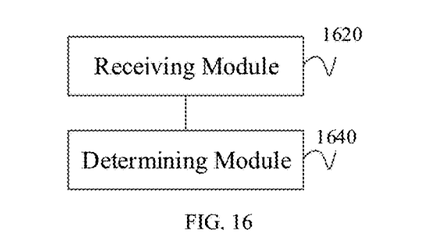
FIG. 16 is a block diagram of a random access occasion (RO) configuration apparatus provided by some examples of the present disclosure.

FIG. 16 shows a block diagram of a random access occasion (RO) configuration apparatus provided by an exemplary embodiment of the present disclosure, and the apparatus includes a receiving module 1620 and a determining module 1640.

The receiving module 1620 is configured to receive configuration parameters of ROs, wherein the configuration parameters includes a shift value of a starting position of at least one shared RO relative to a starting position of at least one RO used for a four-step random access, and the shared RO is a RO that shared by the four-step random access and a two-step random access.

The determining module 1640 is configured to determine a frequency-domain position of the at least one shared RO according to the configuration parameters of ROs.

In an alternative implementation, the configuration parameters of the ROs further includes the starting position of the at least one RO used for the four-step random access.

The determining module 1640 is configured to determine a starting position of the at least one shared RO according to the starting position of the at least one RO used for the four-step random access and the offset value.

In an alternative implementation, the configuration parameters of the ROs further includes a first number $FMD_{2\text{-}step}$, and the first number $FMD_{2\text{-}step}$ is a number of at least one RO that is frequency-division multiplexed (FDM) in frequency domain at a moment of access by the two-step random access.

The determining module 1640 is configured to determine an ending position of the at least one shared RO according to the start position of the at least one shared RO and the first number $FMD_{2\text{-}step}$.

In an alternative implementation, the configuration parameters of the ROs also include a second number $FMD_{4\text{-}step}$, and the second number $FMD_{4\text{-}step}$ is a number of at least one RO that is frequency-division multiplexed (FDM) in frequency domain at a moment of access by the four-step random access.

In an alternative implementation, the first number is less than or equal to the second number.

In an alternative implementation, the configuration parameters of the ROs also include an exclusive number $FMD_{4\text{-}step\ only}$, and the exclusive number $FMD_{4\text{-}step\ only}$ is a number of at least one RO that is frequency-division multiplexed (FDM) in the frequency domain only used for the four-step random access at a moment of access by the four-step random access.

In an alternative implementation, different parameters in the configuration parameters of the ROs are carried in the same or different configuration information.

Figure 17:
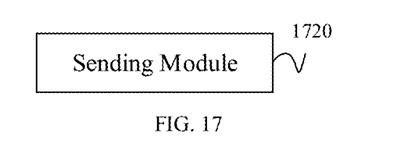
FIG. 17 is a block diagram of a random access occasion (RO) configuration apparatus provided by some examples of the present disclosure.

FIG. 17 shows a block diagram of a random access occasion (OR) configuration apparatus provided by some embodiments of the present disclosure, and the apparatus includes a sending module 1720.

The sending module 1720 is configured to send configuration parameters of ROs, wherein the configuration parameters comprises a shift value of a starting position of at least one shared RO relative to a starting position of at least one RO used for a four-step random access, and the shared RO is a RO that shared by the four-step random access and a two-step random access.

In an alternative implementation, the configuration parameters of the ROs also include the starting position of the at least one RO used for the four-step random access.

In an alternative implementation, the configuration parameters of the ROs also include a first number $FMD_{2\text{-}step}$, and the first number $FMD_{2\text{-}step}$ is a number of at least one RO that is frequency-division multiplexed (FDM) in frequency domain at a moment of access by the two-step random access.

In an alternative implementation, the configuration parameters of the RO also include a second number $FMD_{4\text{-}step}$, and the second number $FMD_{4\text{-}step}$ is a number of at least one RO that is frequency-division multiplexed (FDM) in frequency domain at a moment of access by the four-step random access.

In an alternative implementation, the first number $FMD_{2\text{-}step}$ is less than or equal to the second number $FMD_{4\text{-}step}$.

In an alternative implementation, the configuration parameters of the ROs also include an exclusive number $FMD_{4\text{-}step\ only}$, and the exclusive number $FMD_{4\text{-}step\ only}$ is a number of at least one RO that is frequency-division multiplexed (FDM) in the frequency domain only used for the four-step random access at a moment of access by the four-step random access.

In an alternative implementation, different parameters in the configuration parameters of the ROs are carried in the same or different configuration information.

Figure 18:
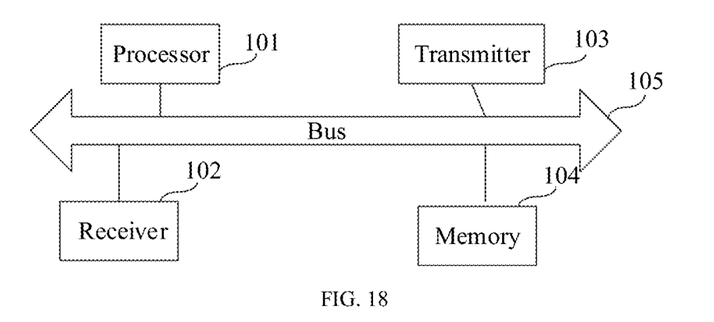
FIG. 18 is a block diagram of a communication device provided by some examples of the present disclosure.

FIG. 18 shows a schematic structural diagram of a communication device (terminal or access network device) provided by some embodiments of the present disclosure. The terminal includes a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 may be implemented as a communication component, which may be a communication chip.

The memory 104 is connected to the processor 101 through the bus 105.

The memory 104 may be configured to store at least one instruction, and the processor 101 may be configured to execute the at least one instruction, so as to implement various steps in the foregoing method embodiments.

Additionally, the memory 104 may be implemented by any type or combination of volatile or non-volatile storage devices including, but not limited to, magnetic or optical disks, electrically erasable programmable Read Only Memory (EEPROM), Erasable Programmable Read Only Memory (EPROM), Static Random Access Memory (SRAM), Read Only Memory (ROM), Magnetic Memory, Flash Memory, Programmable Read Only Memory (PROM) .

In some embodiments, a computer-readable storage medium is also provided, wherein the computer-readable storage medium stores at least one instruction, at least one segment of program, code set or instruction set, the at least one instruction, the at least one segment of program, the code set or the instruction set is loaded and executed by the processor to implement the random access occasion (RO) configuration method executed by the communication device provided by the above method embodiments.

In some embodiments, there is also provided a computer program product in which at least one instruction, at least one segment of program, code set or instruction set is stored, the at least one instruction, the at least one segment of program, the code set or the instruction set is loaded and executed by the processor to implement the random access occasion (RO) configuration method performed by the communication device provided in the above-mentioned various method embodiments.

The embodiments of the present disclosure provide a random access occasion configuration method, an apparatus and storage medium, which can be used to solve the problem of how to configure the shared ROs when the two-step random access and the four-step random access can share the configuration for all or part of the ROs.

In some embodiments of the present disclosure, a random access occasion (RO) configuration method is provided. The random access occasion (RO) configuration method includes: sending, by a access network device, configuration parameters of ROs, wherein the configuration parameters includes a shift value of a starting position of at least one shared RO relative to a starting position of at least one RO used for a four-step random access, and the shared RO is a RO that shared by the four-step random access and a two-step random access.

In some embodiments of the present disclosure, a random access occasion (RO) configuration method is provided. The random access occasion (RO) configuration method includes receiving, a terminal, configuration parameters of ROs, wherein the configuration parameters comprises a shift value of a starting position of at least one shared RO relative to a starting position of at least one RO used for a four-step random access, and the shared RO is a RO that shared by the four-step random access and a two-step random access; and determining, the terminal, a frequency-domain position of the at least one shared RO according to the configuration parameters of ROs.

In some embodiments, the configuration parameters of the ROs further includes a first number $FDM_{2\text{-}step}$, and the first number $FDM_{2\text{-}step}$ is a number of at least one RO that is frequency-division multiplexed (FDM) in frequency domain at a moment of access by the two-step random access, and is one of the following: 1, 2, 4, and 8.

In some embodiments, the configuration parameters of the ROs further includes a second number $FDM_{4\text{-}step}$ and the second number $FDM_{4\text{-}step}$ is a number of at least one RO that is frequency-division multiplexed (FDM) in frequency domain at a moment of access by the four-step random access, and is one of the following: 1, 2, 4, and 8.

In some embodiments, the first number $FDM_{2\text{-}step}$ is less than or equal to the second number $FDM_{4\text{-}step}$.

In some embodiments, the configuration parameters of the ROs further includes an exclusive number $FDM_{4\text{-}step\ only}$, and the exclusive number $FDM_{4\text{-}step\ only}$ is a number of at least one RO that is frequency-division multiplexed (FDM) in the frequency domain only used for the four-step random access at a moment of access by the four-step random access.

In some embodiments, the configuration parameters of the ROs further includes the starting position of the at least one RO used for the four-step random access;

wherein the determining the frequency-domain position of the at least one shared RO according to the configuration parameters of the ROs includes:

determining a starting position of the at least one shared RO according to the starting position of the at least one RO used for the four-step random access and the offset value.

In some embodiments, different parameters in the configuration parameters of the ROs are carried in a same or different configuration information.

In some embodiments of the present disclosure, a random access occasion (RO) configuration apparatus is provided. The random access occasion (RO) configuration apparatus includes a receiving module configured to receive configuration parameters of ROs, wherein the configuration parameters comprises a shift value of a starting position of at least one shared RO relative to a starting position of at least one RO used for a four-step random access, and the shared RO is a RO that shared by the four-step random access and a two-step random access; and a determining module configured to determine a frequency-domain position of the at least one shared RO according to the configuration parameters of ROs.

In some embodiments of the present disclosure, a random access occasion (RO) configuration apparatus is provided. The random access occasion (RO) configuration apparatus includes a sending module configured to send configuration parameters of ROs, wherein the configuration parameters comprises a shift value of a starting position of at least one shared RO relative to a starting position of at least one RO used for a four-step random access, and the shared RO is a RO that shared by the four-step random access and a two-step random access.

In some embodiments of the present disclosure, a terminal is provided. The terminal includes: a processor; a transceiver connected to the processor; and a memory for storing instructions executable by the processor; wherein the processor is configured to load and execute the instructions to implement the random access occasion (RO) configuration method according to one aspect mentioned above.

In some embodiments of the present disclosure, an access network device is provided. The access network device includes: a processor; a transceiver connected to the processor; a memory for storing instructions executable by the processor; wherein the processor is configured to load and execute the instructions to implement the random access occasion (RO) configuration method according to one aspect mentioned above.

In some embodiments of the present disclosure, a non-transitory computer-readable storage medium is provided. Executable instructions are stored in the computer-readable storage medium and are loaded and executed by the processor to implement the random access occasion (RO) configuration method according to one aspect mentioned above.

The technical solution provided by the embodiments of the present disclosure may include the following beneficial effects. By configuring, by the access network device, the configuration parameters of the random access occasions (ROs) for the UE, and the configuration parameters including a shift value used to indicate the starting position of the one or more shared ROs, UE can determine the frequency domain position of the one or more shared ROs based on the configuration parameters, so as to realize the flexible configuration of the random access occasions (ROs) in different frequency domain positions, and improve the flexibility of the configuration method.

Those of ordinary skill in the art can understand that all or part of the steps of implementing the above embodiments can be completed by hardware, or can be completed by instructing relevant hardware through a program, and the program can be stored in a computer-readable storage medium. The storage medium mentioned may be a read-only memory, a magnetic disk or an optical disk, etc.

The above are only optional embodiments of the present disclosure, and are not intended to limit the present disclosure. Any modifications, equivalent replacements, improvements, etc. made within the spirit and principles of the present disclosure shall be included in the protection of the present disclosure.

What is claimed is:

1. A random access occasion (RO) configuration method, comprising:
    receiving, by a user equipment (UE), configuration parameters of ROs, wherein the configuration parameters comprise an exclusive number $FDM_{4\text{-}step\ only}$ and a shift value of a starting position of at least one shared RO relative to a starting position of at least one RO adopted for a four-step random access, and wherein the exclusive number $FDM_{4\text{-}step\ only}$ is a number of at least one RO that is frequency-division multiplexed (FDM) in frequency domain only adopted for the four-step random access at a moment of access by the four-step random access, and the shared RO is shared by the four-step random access and a two-step random access; and
    determining, by the UE, a frequency-domain position of the at least one shared RO according to the configuration parameters of ROs;
    wherein the configuration parameters of the ROs further comprise the starting position of the at least one RO adopted for the four-step random access; and
    wherein the determining the frequency-domain position of the at least one shared RO according to the configuration parameters of the ROs comprises:
    determining the starting position of the at least one shared RO according to the shift value and the starting position of the at least one RO adopted for the four-step random access.

2. The method according to claim 1, wherein the configuration parameters of the ROs comprises a first number $FDM_{2\text{-}step}$, and the first number $FDM_{2\text{-}step}$ is a number of at least one RO that is frequency-division multiplexed (FDM) in frequency domain at a moment of access by the two-step random access; and
    wherein the determining the frequency-domain position of the at least one shared RO according to the configuration parameters comprises:
    determining an ending position of the at least one shared RO according to the starting position of the at least one shared RO and the first number $FDM_{2\text{-}step}$.

3. The method according to claim 2, wherein the configuration parameters of the ROs comprises a second number $FDM_{4\text{-}step}$, and the second number $FDM_{4\text{-}step}$ is a number of at least one RO that is frequency-division multiplexed (FDM) in frequency domain at a moment of access by the four-step random access, and
    the first number $FDM_{2\text{-}step}$ is less than or equal to the second number $FDM_{4\text{-}step}$.

4. A non-transitory computer-readable storage medium, wherein executable instructions are stored in the non-transitory computer-readable storage medium, and the executable instructions are loaded and executed by the processor to implement the random access occasion (RO) configuration method according to claim 1.

5. A random access occasion (RO) configuration method, comprising:
    sending, by an access network device, configuration parameters of ROs, wherein the configuration parameters comprise an exclusive number $FDM_{4\text{-}step\ only}$, a starting position of at least one RO adopted for a four-step random access, and a shift value of a starting position of at least one shared RO relative to the starting position of the at least one RO adopted for the four-step random access, and wherein the exclusive number $FDM_{4\text{-}step\ only}$ is a number of at least one RO that is frequency-division multiplexed (FDM) in frequency domain only adopted for the four-step random access at a moment of access by the four-step random access, and the shared RO is shared by the four-step random access and a two-step random access;
    wherein the starting position of the at least one shared RO is determined according to the shift value and the starting position of the at least one RO adopted for the four-step random access.

6. The method according to claim 5, wherein the configuration parameters of the ROs further comprise a first number $FDM_{2\text{-}step}$, and the first number $FDM_{2\text{-}step}$ is a number of at least one RO that is frequency-division multiplexed (FDM) in frequency domain at a moment of access by the two-step random access.

7. The method according to claim 6, wherein the configuration parameters of the ROs further comprise a second number $FDM_{4\text{-}step}$, and the second number $FDM_{4\text{-}step}$ is a number of at least one RO that is frequency-division multiplexed (FDM) in frequency domain at a moment of access by the four-step random access,
    the first number $FDM_{2\text{-}step}$ is less than or equal to the second number $FDM_{4\text{-}step}$.

8. An access network device, comprising:
    a processor;
    a transceiver connected to the processor;
    a memory for storing instructions executable by the processor;
    wherein the processor is configured to load and execute the instructions to implement the random access occasion (RO) configuration method according to claim 5.

9. The access network device according to claim 8, wherein the configuration parameters of the ROs further comprise a first number $FDM_{2\text{-}step}$, and the first number $FDM_{2\text{-}step}$ is a number of at least one RO that is frequency-division multiplexed (FDM) in frequency domain at a moment of access by the two-step random access.

10. The access network device according to claim 9, wherein the configuration parameters of the ROs further comprise a second number $FDM_{4\text{-}step}$, and the second number $FDM_{4\text{-}step}$ is a number of at least one RO that is frequency-division multiplexed (FDM) in frequency domain at a moment of access by the four-step random access,
the first number $FDM_{2\text{-}step}$ is less than or equal to the second number $FDM_{4\text{-}step}$.

11. A terminal, comprising:
a processor;
a transceiver connected to the processor;
a memory for storing instructions executable by the processor;
wherein the processor is configured to:
receive configuration parameters of ROs, wherein the configuration parameters comprise an exclusive number $FDM_{4\text{-}step\ only}$, and a shift value of a starting position of at least one shared RO relative to a starting position of at least one RO adopted for a four-step random access, and wherein the exclusive number $FDM_{4\text{-}step\ only}$ is a number of at least one RO that is frequency-division multiplexed (FDM) in frequency domain only adopted for the four-step random access at a moment of access by the four-step random access, and the shared RO is shared by the four-step random access and a two-step random access; and
determine a frequency-domain position of the at least one shared RO according to the configuration parameters of ROs;
wherein the configuration parameters of the ROs further comprise the starting position of the at least one RO adopted for the four-step random access; and
wherein the processor is configured to:
determine the starting position of the at least one shared RO according to the shift value and the starting position of the at least one RO adopted for the four-step random access.

12. The terminal according to claim 11, wherein the configuration parameters of the ROs further comprise a first number $FDM_{2\text{-}step}$, and the first number $FDM_{2\text{-}step}$ is a number of at least one RO that is frequency-division multiplexed (FDM) in frequency domain at a moment of access by the two-step random access; and
wherein the processor is configured to:
determine an ending position of the at least one shared RO according to the starting position of the at least one shared RO and the first number $FDM_{2\text{-}step}$.

13. The terminal according to claim 12, wherein the configuration parameters of the ROs further comprise a second number $FDM_{4\text{-}step}$, and the second number $FDM_{4\text{-}step}$ is a number of at least one RO that is frequency-division multiplexed (FDM) in frequency domain at a moment of access by the four-step random access,
the first number $FDM_{2\text{-}step}$ is less than or equal to the second number $FDM_{4\text{-}step}$.

* * * * *